(12) United States Patent
Terentic et al.

(10) Patent No.: US 11,364,879 B2
(45) Date of Patent: Jun. 21, 2022

(54) WIPER ARM ADAPTER DEVICE, WIPER ARM WITH A WIPER ARM ADAPTER DEVICE, AND WIPER WITH A WIPER ARM WITH A WIPER ARM ADAPTER DEVICE

(71) Applicant: Robert Bosch GmbH, Stuttgart (DE)

(72) Inventors: Andrija Terentic, Belgrade (RS); Harald Rapp, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 16/992,409

(22) Filed: Aug. 13, 2020

(65) Prior Publication Data

US 2021/0046903 A1 Feb. 18, 2021

(30) Foreign Application Priority Data

Aug. 15, 2019 (DE) .......................... 102019212241.8

(51) Int. Cl.
*B60S 1/34* (2006.01)
*F16K 15/02* (2006.01)
(52) U.S. Cl.
CPC .......... *B60S 1/3415* (2013.01); *F16K 15/021* (2013.01)

(58) Field of Classification Search
CPC ............................. B60S 1/3415; F16K 15/021
See application file for complete search history.

(56) References Cited

U.S. PATENT DOCUMENTS

2011/0185531 A1\* 8/2011 Egner-Walter ........ B60S 1/3862
15/250.01
2014/0366301 A1\* 12/2014 Bousset ................... B60S 1/32
15/250.04

\* cited by examiner

*Primary Examiner* — Andrew A Horton
(74) *Attorney, Agent, or Firm* — Micheal Best & Friedrich LLP

(57) ABSTRACT

A wiper arm adapter device with at least one fluid channel (44a, 46a; 44b, 46b) for conducting a fluid, and with at least one connecting unit (48a; 48b) for connecting the fluid channel (44a, 46a; 44b, 46b) to a fluid line element (36a; 36b) of a wiper arm and/or to a wiper blade adapter (30a; 30b), wherein the connecting unit (48a; 48b) has at least one connecting element (52a, 54a; 52b, 54b) which at least partially delimits the fluid channel (44a, 46a; 44b, 46b). The connecting unit (48a; 48b) has at least one valve element (56a, 58a; 56b, 58b) which is arranged on the connecting element (52a, 54a; 52b, 54b) and is configured to form the fluidic connection of the fluid channel (44a, 46a; 44b, 46b) to the wiper blade adapter (30a; 30b) in a closeable manner.

22 Claims, 4 Drawing Sheets

WIPER ARM ADAPTER DEVICE, WIPER ARM WITH A WIPER ARM ADAPTER DEVICE, AND WIPER WITH A WIPER ARM WITH A WIPER ARM ADAPTER DEVICE

BACKGROUND OF THE INVENTION

A wiper arm adapter device with at least one fluid channel for conducting a fluid, and with at least one connecting unit for connecting the fluid channel to a fluid line element of a wiper arm and/or to a wiper blade adapter, in particular to a fluid attachment element of the wiper blade adapter, has already been proposed, wherein the connecting unit has at least one connecting element which at least partially delimits the fluid channel.

SUMMARY OF THE INVENTION

The invention is based on a wiper arm adapter device with at least one fluid channel for conducting a fluid, and with at least one connecting unit for, in particular fluidically, connecting the fluid channel to a fluid line element of a wiper arm and/or to a wiper blade adapter, in particular to a fluid attachment element of the wiper blade adapter, wherein the connecting unit has at least one connecting element which at least partially delimits the fluid channel.

It is proposed that the connecting unit has at least one valve element which is arranged on the connecting element and is provided to form the fluidic connection of the fluid channel to the wiper blade adapter, in particular to the fluid attachment element, in a closeable manner. "Provided" is intended to be understood as meaning in particular specially configured and/or specially equipped. An object, in particular the valve element, being provided for a certain function is intended to be understood as meaning in particular that the object carries out and/or implements said certain function in at least one use state and/or operating state. In particular, the valve element is arranged at or in the fluid channel. The valve element is preferably fastened to the connecting element or formed integrally with the connecting element. "Integrally" is intended to be understood as meaning in particular connected in an integrally bonded manner, for example by a welding process and/or adhesive bonding process, etc., and particularly advantageously molded on, such as by means of production from a casting and/or by means of production in a single- or multi-component injection molding process. The valve element preferably has at least one closed state and at least one open state. In particular, in the open state of the valve element, the valve element is at least largely arranged outside the fluid channel. In particular, in the closed state of the valve element, at least one cross-sectional area of the fluid channel in at least one sectional plane of the connecting element is at least substantially completely closed by the valve element. The valve element preferably closes the fluid channel completely, in particular in a water-tight manner, in the closed state of the valve element. The valve element is preferably provided to open the fluid channel during an actuation of an actuating element of a wiper, in particular for cleaning a window, wherein the fluid is conducted through the fluid channel via the connecting element and/or the fluid attachment element to a wiper blade, in particular to the wiper blade adapter.

Preferably, the valve element in at least one region of the valve element is designed to be movable relative to the fluid channel and/or is mounted movably on the connecting element. Preferentially, the valve element is provided to at least temporarily open the fluid channel for conducting the fluid to the wiper blade adapter, in particular to the fluid attachment element, in particular for a wiping operation of the wiper. In particular, the valve element is designed to be self-closing, wherein, in particular in the open state, at least one closing force, in particular a spring force, a magnetic force or the like, at least partially acts on the valve element in order to transfer the valve element into the closed state. Preferentially, the valve element is provided to be acted upon, in the open state, in particular permanently, with an opening force which in particular counteracts the closing force in order to retain the open state. It is conceivable for the valve element to be provided to be acted upon with the opening force by the fluid and/or by an actuating element of the connecting unit that is in particular at least partially arranged on the valve element. In particular, the actuating element is designed, for example, as a piezo element, as a linear actuator, as an electromagnet or the like. For example, the valve element is designed in at least one region of the valve element as a spring-loaded ball which is arranged at and/or within the fluid channel and is provided to close the fluid channel in the closed state. In particular, the valve element which is at least partially designed as a spring-loaded ball is provided to be moved counter to a spring force during a transfer into the open state to open the fluid channel. Preferably, the fluid channel is designed in such a manner and/or the valve element is arranged in such a manner that the spring-loaded ball is arranged in the closed state of the valve element in such a manner that the fluid is conducted in an at least substantially unobstructed manner through the fluid channel delimited by the connecting element, in particular from the fluid line element to the wiper blade adapter, in particular the fluid attachment element. For example, the spring-loaded ball in the closed state is arranged in an edge region of the fluid channel and/or on an inner surface of the connecting element delimiting the fluid channel. In another exemplary refinement of the valve element, the valve element is designed in at least one region of the valve element as a flexible element, for example a diaphragm, a tube and/or an, in particular gas-filled, rubber ball, wherein the valve element is provided to be elastically deformed during a transfer into the open state in order to open the fluid channel. Alternatively or additionally, it is conceivable for the valve element to be designed to be at least partially slidable and/or foldable, in particular relative to the cross-sectional area of the fluid channel.

It is conceivable for the connecting unit to comprise at least one coupling element, wherein the coupling element is provided to close the valve element and/or to hold same in the closed state of the valve element depending on at least one unconnected state of the connecting unit, in particular of the connecting element. In particular, the coupling element is arranged on the connecting element. It is conceivable for the coupling element to be mounted movably on the connecting element and/or for the coupling element to be designed to be at least partially magnetizable, wherein in particular the valve element is closed via a magnetic force and/or is held in the closed state of the valve element. Preferably, when the connecting element and the fluid attachment element are separated, the coupling element blocks the valve element, in particular via a form-fitting and/or force-fitting connection to the valve element. In particular, in the unconnected state of the connecting unit, the coupling element is at least partially arranged on the valve element. For example, the coupling element is designed as a spring-loaded pin, wherein, during a connection of the connecting element to the fluid attachment element, the pin releases the valve element by means of a connecting force which is applied counter to a spring force. In particular in the configuration of the coupling element as a spring-loaded pin, the coupling element is provided in order, when the connecting element is separated from the fluid attachment element, to be moved by the spring force into a blocking position, wherein in particular the valve element is closed and/or is held in the closed state of the valve element. In particular in a configuration of the wiper arm adapter device, in particular of the connecting unit, with the actuating element, it is conceivable for the coupling element to be provided to interact with the actuating element in order to close the valve element, in particular when the connecting element and the fluid attachment element are separated. The actuating element is preferably provided in order, upon interaction with the coupling element, to release the opening force from the valve element, in particular for closing the valve element. In particular, the coupling element is provided in order, upon interaction with the actuating element, to separate the actuating element from the valve element.

It is conceivable for the connecting unit to comprise at least one fastening element which is provided to fasten the connecting element to the wiper blade adapter, in particular to the fluid attachment element, in at least one connected state of the connecting unit. For example, the fastening element is designed as a latching element, as part of a screw connection, as part of a bayonet closure, or the like. In particular, the fastening element is arranged on the connecting element, in particular is fastened to the connecting element or is formed integrally with the connecting element. Preferably, the fastening element interacts with at least one counter fastening element of the wiper blade adapter in order to fasten the connecting element to the wiper blade adapter, in particular to the fluid attachment element. It is conceivable for the coupling element to be arranged on the fastening element and/or to interact with the fastening element in order to close the valve element and/or to hold the valve element in the closed state of the valve element. In addition, it is conceivable for the wiper arm adapter device, in particular the connecting unit, to have at least one operating element which is arranged on the connecting element. The operating element is preferably provided for releasing the fastening element from the counter fastening element upon actuation by an operator, in particular for separating the connecting element from the wiper blade adapter, in particular from the fluid attachment element. It is preferentially conceivable for the coupling element and/or the valve element to be designed to be functionally coupled to the operating element and/or to the fastening element, in order to close the valve element, during a separation of the connecting element from the wiper blade adapter, in particular from the fluid attachment element. In particular, it is conceivable for the operating element and/or the fastening element to be designed in such a manner that the valve element is closed and/or is held in a closed state, in particular via the coupling element, when the operating element is actuated and/or the fastening element is released from the counter fastening element.

By means of the refinement according to the invention of the wiper arm adapter device, an advantageously rapid reaction time for starting a wiping operation can be achieved, in particular since a distance which the fluid has to cover from the valve element to a discharge opening, in particular to the wiper blade adapter and/or a wiper strip of the wiper blade, can advantageously be kept small. Low maintenance costs can advantageously be made possible, in particular since the valve element together with the connecting element can be designed as an individually exchangeable and/or reusable component, preferably independently of the wiper blade. An advantageously simple and rapid maintenance of the wiper arm adapter device, in particular of the valve element, can be made possible, in particular since the valve element can be arranged in an easily accessible manner.

Furthermore, it is proposed that the valve element is provided to close the fluid channel, in particular in a water-tight manner, depending on a state characteristic variable of the fluid disposed in particular within an immediate vicinity of the fluid channel that is adjacent to the valve element. The at least one state characteristic variable of the fluid is preferably in the form of a pressure, a volumetric flow, a temperature, a portion of foreign bodies in the fluid, or the like. In particular, the immediate vicinity of the fluid channel that is adjacent to the valve element extends within the fluid channel at a maximum distance of in particular at most 3 cm, preferably at most 2 cm and particularly preferably at most 1 cm about the valve element. Preferentially, the valve element is provided to be triggered mechanically when at least one limit value of the state characteristic variable of the fluid arranged within the immediate vicinity is exceeded, wherein in particular the fluid channel is closed, in particular in a water-tight manner, when the valve element is triggered. For example, in a configuration of the state characteristic variable of the fluid as pressure, it is conceivable for the valve element to be transferred into the closed state directly via the fluid, in particular via a force exerted on the valve element by the pressure of the fluid. Particularly preferentially, the valve element is provided to open or to release the fluid channel depending on the state characteristic variable of the fluid, in particular after the state characteristic variable of the fluid has dropped below the limit value. Alternatively or additionally, it is conceivable for the wiper arm adapter device to comprise at least one sensor unit for sensing the state characteristic variable of the fluid within the fluid channel. In particular, the sensor unit comprises at least one sensor element which is arranged on the connecting element and/or the valve element. The sensor element is preferably arranged at least within the immediate vicinity of the fluid channel that is adjacent to the valve element. Particularly preferentially, the sensor element is provided to sense the state characteristic variable of the fluid arranged within the immediate vicinity. For example, the sensor element is in the form of an, in particular optical or mechanical, flow meter, a manometer, a thermometer, an optical sensor, preferably for sensing foreign bodies in the fluid, or the like, in particular depending on a type of state characteristic variable of the fluid to be sensed. The valve element is preferably connected to the sensor unit, in particular to the sensor element, in particular via a control and/or regulating unit of the wiper arm adapter device and/or of the wiper. The valve element is preferably provided in order to close the fluid channel, in particular in a water-tight manner, when a limit value of the state characteristic variable of the fluid sensed by means of the sensor unit, in particular the sensor element, is exceeded. An advantageously simple control of the valve element can be made possible, in particular since the valve element can be controlled by regulation of the state characteristic variable of the fluid. Inadvertent, for example temperature-induced, pressure-induced and/or soiling-induced, damage of the wiper blade, in particular of the wiper blade adapter, can be advantageously avoided.

In addition, it is proposed that the valve element is arranged within a wiper-blade-adapter-side end region or a fluid-line-element-side end region of the fluid channel. Preferably, the wiper-blade-adapter-side end region and/or the fluid-line-element-side end region extend/extends within a region of the fluid channel that is delimited by the connecting element. Preferably, the wiper-blade-adapter-side end region and/or the fluid-line-element-side end region extend/extends along the fluid channel over in particular at most 3 cm, preferably at most 2 cm and particularly preferentially at most 1 cm. In particular, the wiper-blade-adapter-side end region is arranged on a side of that region of the fluid channel which is delimited by the connecting element, which side is arranged in one plane with a wiper-blade-adapter-side outer surface of the connecting element, wherein, in the connected state of the connecting unit, the wiper-blade-adapter-side outer surface is at least partially arranged on and/or lies against the wiper blade adapter. Preferentially, the fluid-line-element-side end region is arranged on a side, in particular another side, of that region of the fluid channel that is delimited by the connecting element, said side being arranged in one plane with a fluid-line-element-side outer surface of the connecting element, wherein the fluid-line-element-side outer surface, in particular in the connected state of the connecting unit, is at least partially arranged on and/or lies against the fluid line element. An advantageously rapid and simple maintenance, installation and/or removal of the valve element and/or of the connecting element can be made possible, in particular since the valve element can be arranged in a region of the connecting element that is accessible from the outside. Low production and/or maintenance costs can advantageously be made possible, in particular since the connecting element can be at least largely formed integrally independently of the valve element and/or the valve element can be mounted on the connecting element after production of the connecting element.

Furthermore, it is proposed that the connecting element is at least partially designed as an attachment stub in at least one attachment region of the connecting element, wherein the valve element is at least partially arranged within the attachment region. Particularly preferentially, the connecting element has at least two attachment regions, wherein the connecting element in the two attachment regions is at least partially designed as an attachment stub. Preferably, the attachment stubs in each case at least partially delimit the fluid channel individually. In particular, one attachment stub of the two attachment stubs at least partially delimits the fluid-line-element-side end region of the fluid channel. Preferentially, a further attachment stub of the two attachment stubs at least partially delimits the wiper-blade-adapter-side end region of the fluid channel. The attachment stub is preferably provided to connect the connecting element to the fluid line element, in particular fluidically, in particular to fasten same to the fluid line element. Preferentially, the further attachment stub is provided to connect the connecting element to the fluid attachment element, in particular fluidically, in particular to fasten same to the fluid attachment element. It is conceivable for the attachment stub and the further attachment stub to differ in design from each other, wherein in particular the attachment stub is designed in a manner corresponding to the fluid line element and the further attachment stub is designed in a manner corresponding to the fluid attachment element. Preferably, the fluid channel has a cross-sectional area in the form of a conical section area, in particular circular area or elliptical area, or polygonal area, within a region of the fluid channel that is delimited by the connecting element, in particular the attachment stub and/or the further attachment stub. In particular, that region of the fluid channel which is delimited by the connecting element extends along a section which has a maximum length with a value from a value range of in particular 2 cm to 10 cm, preferably 3 cm to 8 cm and particularly preferentially 4 cm to 6 cm. Preferably, a region of the fluid channel that is delimited by the attachment stub and/or by the further attachment stub extends along a section which has a maximum length which corresponds in particular to at least 30%, preferably at least 50% and particularly preferentially at least 60%, of the maximum length of the section of that region of the fluid channel which is delimited by the connecting element. In particular, the attachment stub has at least one center axis which, in the connected state of the connecting unit, is oriented at least substantially parallel to a main axis of extent of the fluid line element. A "main axis of extent" of a component, in particular of the fluid line element, is intended to be understood as meaning in particular an axis which runs parallel to a longest edge of a smallest geometrical cuboid which just completely surrounds the object. "Substantially parallel" is intended to be understood as meaning in particular an orientation of a straight line or of a plane relative to a further straight line or a further plane, in particular in a plane of projection, wherein the straight line or the plane has a deviation in particular of less than 8°, advantageously of less than 5° and particularly advantageously of less than 2°, in relation to the further straight line or the further plane. The further attachment stub preferentially has at least one center axis which, in the connected state of the connecting unit, is oriented at least substantially perpendicularly to a main axis of extent of the wiper blade adapter. "Substantially perpendicularly" is intended to be understood as meaning in particular an orientation of a straight line or of a plane relative to a further straight line or a further plane, wherein the straight line or the plane and the further straight line or the further plane enclose an angle of 90°, in particular as viewed in a plane of projection, and the angle has a maximum deviation of in particular less than 8°, advantageously of less than 5° and particularly advantageously of less than 2°. The center axis of the attachment stub is preferably oriented transversely, in particular at least substantially perpendicularly, to the center axis of the further attachment stub. In particular, the attachment stub is provided to be connected to the fluid line element at least partially via a movement along the center axis of the attachment stub. The further attachment stub is preferably provided to be connected to the fluid attachment element at least partially via a movement along the center axis of the further attachment stub. An advantageously rapid and simple maintenance, installation and/or removal of the valve element and/or of the connecting element can be made possible, in particular since the valve element can be arranged in the attachment stub which is accessible from the outside. Low production costs can advantageously be made possible, in particular since the valve element can be mounted on the connecting element after production of the connecting element.

Furthermore, it is proposed that the connecting element is designed in such a manner and/or the valve element is arranged in such a manner that the fluid channel is formed at least substantially rectilinearly at a minimum distance of at least 0.5 cm, preferably at least 1 cm and particularly preferentially at least 1.5 cm, from the valve element in and/or counter to a conducting direction of the connecting element. "Substantially rectilinearly" is intended to be understood as meaning that at least one contour or an outer surface, in particular a surface of the connecting element that delimits the fluid channel, of a component, in particular of the fluid channel delimited by the connecting element, has a maximum deviation of less than 8°, preferably of less than 5° and particularly preferentially of less than 2°, at at least one straight line or a plane which intersects the contour or the outer surface at least at one point. In particular, that region of the fluid channel which is delimited by the connecting element is formed along a curved or an L-shaped conducting section, wherein in particular the conducting section is at least partially formed at least substantially rectilinearly, in particular in a region of the fluid channel in which the valve element is arranged. The conducting direction is preferably oriented along the conducting section, in particular from the fluid-line-element-side end region to the wiper-blade-adapter-side end region. However, it is also conceivable for the conducting section to be formed, in particular at least substantially completely, at least substantially rectilinearly. An advantageously laminar flow of the fluid through the valve element can be made possible. Undesired damage of the fluid channel and/or of the fluid attachment element due to swirling of the fluid in the immediate vicinity of the valve element can advantageously be prevented. Undesired delays during a flow of the fluid through the fluid channel due to swirling of the fluid in the immediate vicinity of the valve element can advantageously be prevented. An advantageously high reaction time for starting a wiping operation can be made possible.

In addition, it is proposed that the valve element is designed as a Dunlop valve, as a Sclaverand valve, as a Schrader valve, as a diaphragm valve or as a nonreturn valve. However, it is also conceivable for the valve element to have another configuration appearing expedient to a person skilled in the art. An advantageously simple design of the valve element can be made possible. Control of the valve element via a pressure of the fluid on the valve element can advantageously be made possible.

Furthermore, it is proposed that the connecting unit has at least one further connecting element and at least one further valve element, wherein the further valve element is arranged on the further connecting element. In particular, the further valve element is formed at least substantially identically to the valve element. Preferably, the further connecting element is formed at least substantially identically to the connecting element. The wiper arm adapter device preferably comprises at least one further fluid channel, wherein in particular the further connecting element at least partially delimits the further fluid channel. In particular, the further connecting element is provided to connect the further fluid channel to the fluid line element and/or to a further fluid line element of a wiper arm and/or to the wiper blade adapter, in particular to the fluid attachment element and/or to a further fluid attachment element of the wiper blade adapter. The fluid channel and the further fluid channel are preferentially formed separately from each other fluidically. Preferably, the further connecting element is arranged on the connecting element, in particular in the connected state of the connecting unit. Preferentially, the further connecting element is fastened to the connecting element or is formed integrally with the connecting element. A wiper arm adapter device for wiper blades, in particular wiper blade adapters, with two separate fluid lines can advantageously be provided. Two fluid flows running separately from each other can advantageously be controlled independently of each other by means of the valve elements.

Furthermore, it is proposed that the valve element is designed to be activatable electrically, electronically, mechanically, pneumatically and/or hydraulically. In particular, the valve element is provided in order, upon activation, to change into the closed or the open state of the valve element. It is conceivable that the wiper arm adapter device comprises at least one communication unit and/or line unit which is provided to connect the valve element to the control and/or regulating unit of the wiper arm adapter device and/or of the wiper. Preferably, the communication unit and/or line unit comprises at least one communication element and/or line element which is arranged on the valve element. For example, the communication element and/or line element runs from the valve element, in particular along the wiper arm and/or the fluid line element, as far as the control and/or regulating unit. Preferably, the communication element and/or line element is provided for transmitting at least one optical, haptic and/or acoustic signal from the control and/or regulating unit to the valve element, in particular for control and/or regulation of the valve element. In particular in a refinement of the wiper arm adapter device, in which the valve element can be activated electrically and/or electronically, it is conceivable for the communication element and/or line element to be provided to transmit control signals of the control and/or regulating unit, in particular for controlling and/or regulating the valve element, to the valve element via a wireless connection, for example a radio connection and/or an induction-based connection. In particular, the valve element is provided to change into the closed or the open state of the valve element depending on the control commands transmitted. In particular in a configuration of the wiper arm adapter device, in particular of the connecting unit, with the actuating element, the control and/or regulating unit is preferably configured in order, preferentially via the communication unit and/or line unit, in particular the communication element and/or line element, to activate the actuating element in order to open the valve element. The actuating element is preferentially provided in order, upon activation by the control and/or regulating unit, to act upon the valve element with the opening force in order to open the fluid channel. In particular in a configuration of the wiper arm adapter device with the sensor unit, it is conceivable for the communication unit and/or line unit to be provided to transmit the state characteristic variable sensed by means of the sensor unit from the sensor unit to the control and/or regulating unit. In particular, the communication element and/or line element is connected to the sensor element of the sensor unit. In particular in a configuration of the wiper arm adapter device with the coupling element, it is conceivable for the coupling element to preferably be provided to activate the valve element, in particular depending on the unconnected state of the connecting unit. An advantageously individual control of the valve element can be made possible. An operation of the valve element independently of the state characteristic variable of the fluid can advantageously be made possible, in particular for cleaning the fluid channel at a lower pressure, for maintenance of the wiper arm device, for automatic diagnosis of the valve element, or the like.

In addition, a wiper arm with at least one, in particular the previously mentioned, wiper arm adapter device according to the invention is proposed. In particular, the wiper arm comprises at least one wiper rod, along which the fluid line element runs. Preferably, the fluid line element is at least partially, in particular at least mostly, surrounded by the wiper rod and/or by a covering element of the wiper arm along a main axis of extent of the wiper arm, in particular as viewed in a plane extending at least substantially perpendicularly to the main axis of extent of the wiper arm. The wiper arm preferably comprises a wiper arm adapter for fastening the wiper blade, in particular the wiper blade adapter, to the wiper arm. The wiper arm adapter comprises at least one bearing element, which is designed in particular as a bearing bolt, for pivotably mounting the wiper blade, in particular the wiper blade adapter, on the wiper arm, in particular on the wiper arm adapter. The wiper arm adapter comprises at least one fixing element which is provided to fix the wiper blade, in particular the wiper blade adapter, in at least one position relative to the wiper arm, in particular relative to the wiper arm adapter. Preferably, at least the connecting unit, in particular the connecting element, is arranged, as viewed along the main axis of extent of the wiper arm, in a direction from the fixing element and/or the bearing element that faces the wiper rod and/or the fluid line element.

By means of the refinement according to the invention of the wiper arm, an advantageously rapid reaction time for starting a wiping operation can be achieved, in particular since a distance which the fluid has to cover from the valve element to a discharge opening, in particular to the wiper blade adapter and/or a wiper strip of the wiper blade, can advantageously be kept small. Low maintenance costs can advantageously be made possible, in particular since the valve element together with the connecting element can be designed as an individually exchangeable and/or reusable component, preferably independently of the remaining wiper arm adapter and/or wiper rod. An advantageously simple and rapid maintenance of the wiper arm, in particular of the valve element, can be made possible, in particular since the valve element can be arranged in an easily accessible manner.

In addition, a wiper with at least one, in particular the previously mentioned, wiper blade and with at least one, in particular the previously mentioned, wiper arm according to the invention is proposed. The wiper preferably comprises at least one fluid container which is connected to the wiper blade adapter, in particular to the fluid attachment element, in particular via the fluid line element and/or the connecting unit, in particular the connecting element. The wiper preferably comprises at least one pump unit which is provided to convey the fluid from the fluid container via the fluid line element and/or the connecting unit, in particular the connecting element, to the wiper blade adapter, in particular to the fluid attachment element. In particular, the wiper comprises the actuating element which is provided to activate at least the pump unit and/or the valve element, in particular upon actuation by a user. Preferentially, the wiper comprises a control and/or regulating unit which is configured for controlling and/or regulating at least the pump unit and/or the valve element.

By means of the refinement according to the invention of the wiper, an advantageously rapid reaction time for starting a wiping operation can be achieved, in particular since a distance which the fluid has to cover from the valve element to a discharge opening, in particular to the wiper blade adapter and/or a wiper strip of the wiper blade, can advantageously be kept small. Low maintenance costs can advantageously be made possible, in particular since the valve element together with the connecting element can be designed as an individually exchangeable and/or reusable component, preferably independently of the wiper blade. An advantageously simple and rapid maintenance of the wiper, in particular of the valve element, can be made possible, in particular since the valve element can be arranged in an easily accessible manner.

The wiper arm adapter device according to the invention, the wiper arm according to the invention and/or the wiper according to the invention are/is not intended to be limited here to the above-described use and embodiment. In particular, the wiper arm adapter device according to the invention, the wiper arm according to the invention and/or the wiper according to the invention can have a number of individual elements, components and units differing from a number mentioned herein in order to carry out a manner of operation described herein. In addition, with the value ranges specified in this disclosure, the intention is also for values lying within the stated limits to be considered as being disclosed and usable in any desired way.

BRIEF DESCRIPTION OF THE DRAWINGS

Further advantages emerge from the description below of the drawings. The drawings illustrate two exemplary embodiments of the invention. The drawings, the description and the claims contain numerous features in combination. A person skilled in the art will expediently also consider the features individually and combine them into advantageous further combinations.

In the drawings.

DETAILED DESCRIPTION

Figure 1:
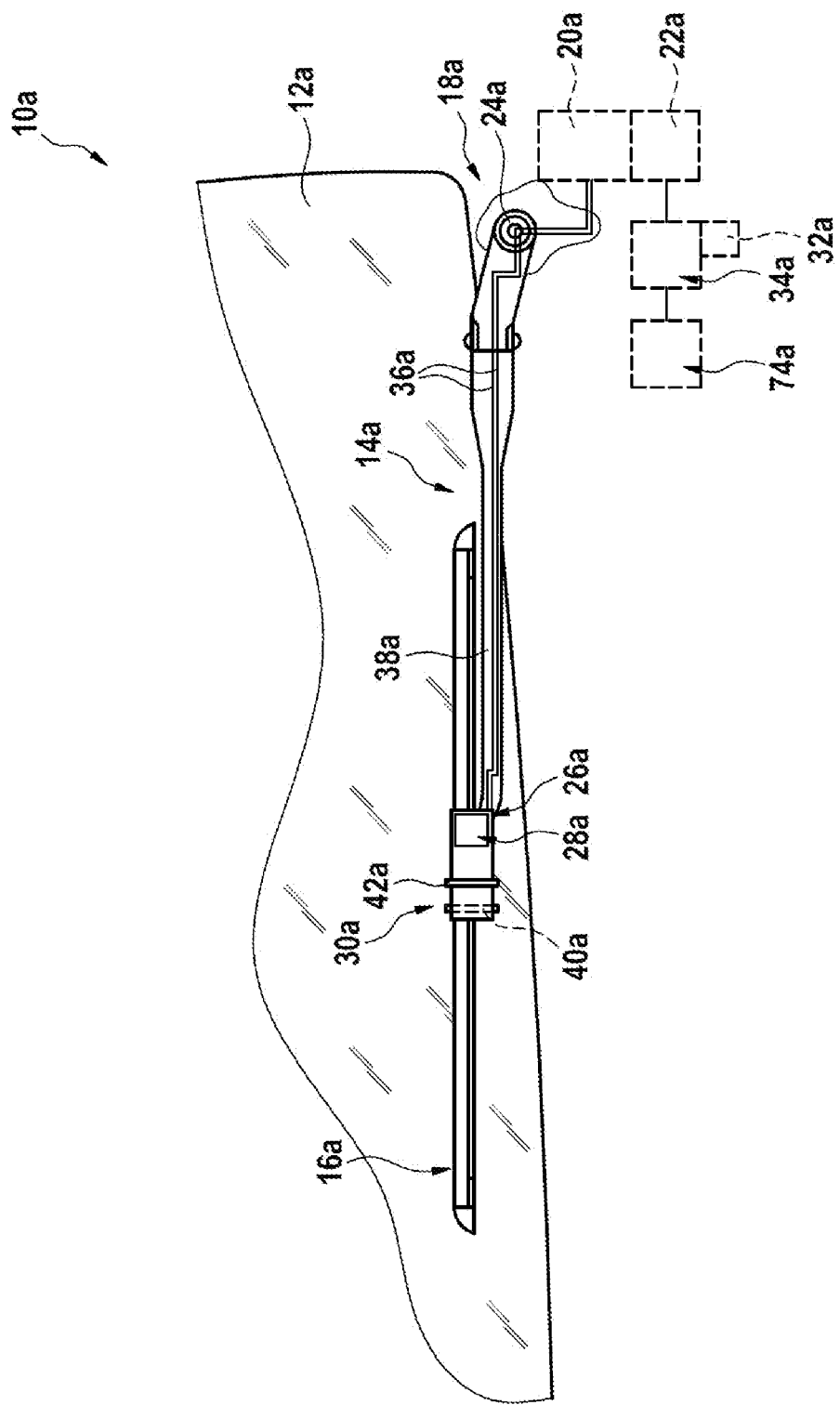
FIG. 1 shows a schematic illustration of a wiper according to the invention with a wiper arm according to the invention which has a wiper arm adapter device according to the invention.

FIG. 1 shows a wiper 10a in a mounted state on a window 12a. The window 12a is designed in particular as a front windscreen of a vehicle which is not shown in the figure. However, it is also conceivable for the wiper 10a to be arranged on a window 12a of a stationary object, such as, for example, of a building, or of another means of locomotion. The wiper 10a comprises a wiper arm 14a, a wiper blade 16a, a drive unit 18a, a fluid container 20a and a pump unit 22a. The drive unit 18a preferably has a drive shaft 24a which is driven via a drive element of the drive unit 18a, which drive unit is in particular not shown in FIG. 1, wherein in particular the wiper arm 14a is fastened to the drive shaft 24a and is movable along the window 12a via the drive shaft 24a. The wiper arm 14a comprises a wiper arm adapter 26a and a wiper arm adapter device 28a. The wiper blade 16a comprises a wiper blade adapter 30a, wherein the wiper blade 16a is fastenable to the wiper arm 14a, in particular to the wiper arm adapter 26a, via the wiper blade adapter 30a. In particular, the wiper blade 16a is mounted rotatably relative to the wiper arm 14a via the wiper blade adapter 30a and the wiper arm adapter 26a in at least one operating state of the wiper 10a, in particular for installing or removing the wiper blade 16a. The wiper 10a comprises an actuating element 32a, designed in particular as a wiper lever, for controlling and/or regulating at least one function of the wiper 10a by a user. The wiper 10a comprises a control and/or regulating unit 34a which is configured for at least controlling and/or regulating the pump unit 22a.

The wiper arm 14a has two fluid line elements 36a, a wiper rod 38a, a bearing element 40a designed in particular as a bearing bolt, and a fixing element 42a designed in particular as a holding finger. The fixing element 42a is provided in particular to fix the wiper blade 16a, in particular the wiper blade adapter 30a, in at least one position relative to the wiper arm 14a, in particular to the wiper arm adapter 26a. The fixing element 42a is preferably provided to at least partially engage around the wiper blade adapter 30a in at least one mounted state of the wiper blade adapter 30a. In particular, the wiper blade adapter 30a is mounted on the wiper arm adapter 26a in a movable, in particular pivotable, manner via the bearing element 40a of the wiper arm adapter 26a. The wiper arm adapter device 28a comprises two fluid channels 44a, 46a for conducting a fluid, a connecting unit 48a for an, in particular fluidic, connection in each case to one of the fluid channels 44a, 46a by in each case one of the fluid line elements 36a of the wiper arm 14a and/or to the wiper blade adapter 30a, in particular to one of two fluid attachment elements 50a of the wiper blade adapter 30a. The fluid line elements 36a are provided in particular for a fluidic connection of the fluid container 20a and the connecting unit 48a. The fluid line elements 36a run at least partially along the wiper arm 14a, in particular from the drive shaft 24a as far as the wiper arm adapter 26a. The pump unit 22a is provided in particular for conveying the fluid from the fluid container 20a via the fluid line elements 36a and/or via the connecting unit 48a to the wiper blade adapter 30a, in particular to the fluid attachment elements 50a.

Figure 2:
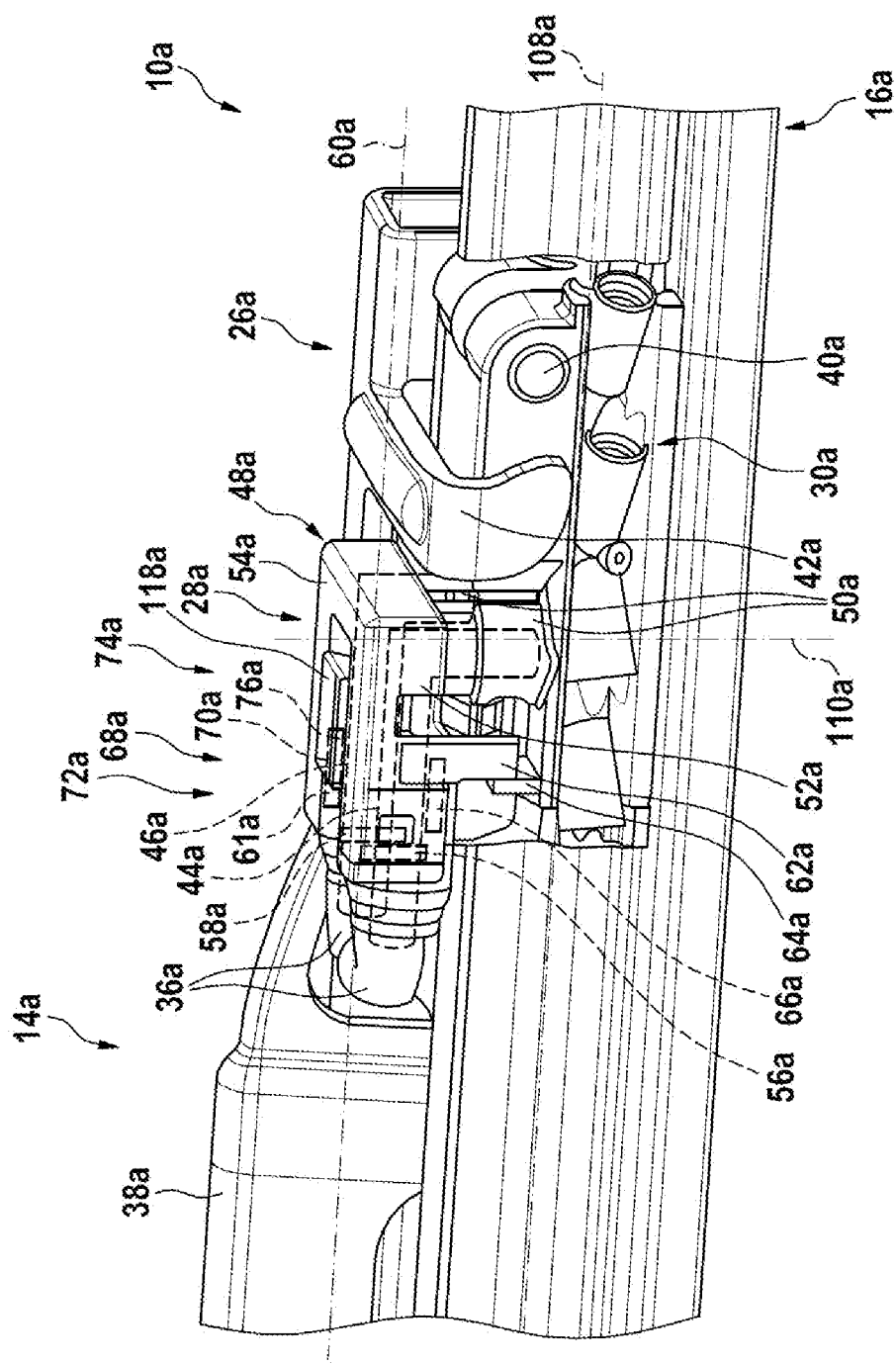
FIG. 2 shows a schematic detailed view of the wiper according to the invention in a region of the wiper arm adapter device according to the invention.

FIG. 2 shows a detailed view of the wiper arm adapter device 28a in a connected state of the connecting unit 48a. The connecting unit 48a comprises a connecting element 52a and a further connecting element 54a, which connecting elements are formed integrally. However, it is also conceivable for the connecting element 52a and the further connecting element 54a to be formed separately from each other and/or to be fastened to each other. The connecting element 52a and the further connecting element 54a each at least partially delimit one of the two fluid channels 44a, 46a. The connecting unit 48a comprises a valve element 56a and a further valve element 58a, wherein the valve element 56a is arranged on the connecting element 52a and the further valve element 58a is arranged on the further connecting element 54a. The valve element 56a and the further valve element 58a are provided in order to form the fluidic connection of the fluid channels 44a, 46a to the wiper blade adapter 30a, in particular to the fluid attachment elements 50a, in a closeable manner. The connecting element 52a delimits a fluid channel 44a of the two fluid channels 44a, 46a. The further connecting element 54a delimits a further fluid channel 46a of the two fluid channels 44a, 46a. The two fluid channels 44a, 46a are formed in a manner fluidically separated from each other via the connecting element 52a and the further connecting element 54a. The fluid line elements 36a at least partially run along the wiper rod 38a. The fluid line elements 36a are at least largely surrounded by the wiper rod 38a along a main axis of extent 60a of the wiper arm 14a, in particular as viewed in a plane extending at least substantially perpendicularly to the main axis of extent 60a of the wiper arm 14a. In particular, the connecting unit 48a, in particular the connecting element 52a and/or the further connecting element 54a, are arranged in a direction from the fixing element 42a and/or the bearing element 40a that faces the wiper rod 38a and/or the fluid line elements 36a, as viewed along the main axis of extent 60a of the wiper arm 14a.

The valve element 56a and the further valve element 58a are designed as Dunlop valves. However, other configurations of the valve elements 56a, 58a are also conceivable, for example as a Sclaverand valve, as a Schrader valve, as a diaphragm valve or as a nonreturn valve. The valve element 56a and the further valve element 58a are designed to be activatable mechanically and/or hydraulically, in particular via the fluid. However, it is also conceivable for the valve element 56a and the further valve element 58a to be designed to be activatable electrically, electronically and/or pneumatically, for example by means of the control and/or regulating unit 34a of the wiper 10a. In particular, the valve element 56a and/or the further valve element 58a are/is provided to change into the closed or the open state upon activation. Preferably, the valve element 56a is designed in at least one region of the valve element 56a to be movable relative to the fluid channel 44a and/or is mounted on the connecting element 52a. In particular, the further valve element 58a in at least one region of the further valve element 58a is provided to be movable relative to the further fluid channel 46a and/or is mounted in particular on the further connecting element 54a. It is conceivable for the valve element 56a and the further valve element 58a to be designed to be self-closing, wherein in particular in the open state at least one closing force, in particular a spring force, at least partially acts on the valve element 56a and the further valve element 58a in order to transfer the valve element 56a and the further valve element 58a into the closed state. For example, the valve elements 56a, 58a are designed in at least one region as a spring-loaded ball or as a flexible element, such as in particular a diaphragm, a tube and/or an, in particular gas-filled, rubber ball. It is conceivable for the valve element 56a and/or the further valve element 58a to be provided to be acted upon with the opening force by the fluid and/or by an actuating element 61a of the connecting unit 48a, the actuating element being arranged in particular at least partially on the valve element 56a.

The valve element 56a is arranged at or in the fluid channel 44a delimited by the connecting element 52a. The further valve element 58a is arranged at or in the further fluid channel 46a delimited by the further connecting element 54a. In particular, the valve element 56a is formed integrally with the connecting element 52a. Preferentially, the further valve element 58a is formed integrally with the further connecting element 54a. The valve element 56a and the further valve element 58a preferably have at least one closed state and at least one open state. In particular, in the open state of the valve element 56a, the valve element 56a is at least largely arranged outside the fluid channel 44a. Preferentially, in the open state of the further valve element 58a, the further valve element 58a is at least largely arranged outside the further fluid channel 46a. In particular, in the closed state of the valve element 56a, at least one cross-sectional area of the fluid channel 44a is at least substantially completely closed by the valve element 56a in at least one section plane of the connecting element 52a. Preferentially, in the closed state of the further valve element 58a, at least one cross-sectional area of the further fluid channel 46a is at least substantially completely closed by the further valve element 58a in at least one section plane of the further connecting element 54a. Preferentially, in the closed state of the valve element 56a and of the further valve element 58a, the valve element 56a and the further valve element 58a close the fluid channels 44a, 46a in a water-tight manner. Preferably, the valve element 56a and/or the further valve element 58a are/is provided in order to open the fluid channel 44a and/or the further fluid channel 46a upon actuation of the actuating element 32a of the wiper 10a, in particular for cleaning the window 12a, wherein the fluid is conducted through the fluid channel 44a and/or the further fluid channel 46a via the connecting element 52a, the further connecting element 54a and/or the fluid attachment elements 50a to the wiper blade 16a, in particular to the wiper blade adapter 30a.

The connecting unit 48a comprises two fastening elements 62a which are provided to fasten the connecting element 52a and the further connecting element 54a to the wiper blade adapter 30a, in particular to the fluid attachment elements 50a, in the connected state of the connecting unit 48a. In particular, FIG. 2 shows only one of the two fastening elements 62a, wherein the other of the two fastening elements 62a is arranged on the further connecting element 54a on a remote side of the connecting unit 48a. The fastening elements 62a are designed as latching elements. Other configurations of the fastening elements 62a are also conceivable, for example as part of a screw connection, as part of a bayonet closure, or the like. The fastening elements 62a are formed integrally with the connecting element 52a and the further connecting element 54a. Preferably, the fastening elements 62a interact with two counter fastening elements 64a of the wiper blade adapter 30a, which counter fastening elements are arranged on the fluid attachment elements 50a, in order to fasten the connecting element 52a and the further connecting element 54a to the wiper blade adapter 30a, in particular to the fluid attachment elements 50a.

It is conceivable for the connecting unit 48a to comprise at least one coupling element 66a, wherein the coupling element 66a is provided to close the valve element 56a and the further valve element 58a depending on at least one unconnected state of the connecting unit 48a, in particular of the connecting element 52a and the further connecting element 54a, and/or to hold same in the closed state. In particular, the coupling element 66a is arranged on the connecting element 52a and/or on the further connecting element 54a. It is conceivable for the coupling element 66a to be mounted movably on the connecting element 52a and/or on the further connecting element 54a, and/or for the coupling element 66a to be designed to be at least partially magnetizable, wherein in particular the valve element 56a and the further valve element 58a depending on the unconnected state of the connecting unit 48a are closed via a magnetic force and/or are held in the closed state of the valve element 56a. During a separation of the connecting element 52a and of the further connecting element 54a from the fluid attachment elements 50a, the coupling element 66a preferably blocks the valve element 56a and the further valve element 58a, in particular via a form-fitting and/or force-fitting connection to the valve element 56a and to the further valve element 58a. In particular, in the unconnected state of the connecting unit 48a, the coupling element 66a is at least partially arranged on the valve element 56a and the further valve element 58a. For example, the coupling element 66a is designed as a spring-loaded pin, wherein, when the connecting element 52a and the further connecting element 54a are connected to the fluid attachment elements 50a, the pin opens up the valve element 56a and the further valve element 58a by means of a connecting force applied counter to a spring force. In particular in the configuration of the coupling element 66a as a spring-loaded pin, the coupling element 66a is provided to be moved by the spring force into a blocking position when the connecting element 52a and the further connecting element 54a are separated from the fluid attachment elements 50a, wherein in particular the valve element 56a and the further valve element 58a are closed and/or are held in the closed state. It is conceivable for the coupling element 66a to be arranged on at least one of the fastening elements 62a and/or to interact with the fastening elements 62a for closing the valve element 56a and the further valve element 58a and/or for holding the valve element 56a and the further valve element 58a in the closed state. In particular in a configuration of the wiper arm adapter device 28a, in particular of the connecting unit 48a, with the actuating element 61a, it is conceivable for the coupling element 66a to be provided in order to interact with the actuating element 61a for closing the valve element 56a and/or the further valve element 58a, in particular when the connecting element 52a, the further connecting element 54a and the fluid attachment elements 50a are separated. Preferentially, the actuating element 61a is provided in order, upon interaction with the coupling element 66a, to detach the opening force from the valve element 56a and/or the further valve element 58a, in particular for closing the valve element 56a and/or the further valve element 58a. In particular, the coupling element 66a is provided in order, upon the interaction with the actuating element 61a, to separate the actuating element 61a from the valve element 56a and/or the further valve element 58a.

It is conceivable for the wiper arm adapter device 28a to comprise a sensor unit 68a for sensing a state characteristic variable of the fluid within the fluid channels 44a, 46a. In particular, the sensor unit 68a comprises a sensor element 70a which is arranged on the connecting element 52a, the further connecting element 54a, the valve element 56a and/or the further valve element 58a. Preferably, the sensor element 70a is arranged at least within an immediate vicinity 72a of at least one of the fluid channels 44a, 46a that is adjacent to the valve element 56a or to the further valve element 58a. Particularly preferably, the sensor element 70a is provided to sense the state characteristic variable of a fluid arranged within the immediate vicinity 72a. For example, in particular depending on a type of state characteristic variable to be sensed of the fluid, the sensor element 70a is designed as an, in particular optical or mechanical, flow meter, as a manometer, as a thermometer, as an optical sensor, preferably for sensing foreign bodies in the fluid, or the like. Preferably, the valve element 56a and the further valve element 58a are connected to the sensor unit 68a, in particular to the sensor element 70a, in particular via the control and/or regulating unit 34a. The valve element 56a and the further valve element 58a are preferentially provided in order to close the fluid channels 44a, 46a, in particular in a water-tight manner, when a limit value of the state characteristic variable of the fluid sensed by means of the sensor unit 68a, in particular the sensor element 70a, is exceeded.

The valve element 56a and the further valve element 58a are provided for closing the fluid channels 44a, 46a, in particular in a water-tight manner, depending on the state characteristic variable of the fluid arranged in particular within the immediate vicinity 72a of one of the fluid channels 44a, 46a that is adjacent to the valve element 56a. The state characteristic variable of the fluid is designed as a pressure of the fluid. However, it is also conceivable, in particular depending on a configuration of the valve elements 56a, 58a, for the state characteristic variable to be designed as a volumetric flow, as a temperature, as a portion of foreign bodies in the fluid or the like. The valve element 56a and the further valve element 58a are provided in order to be mechanically triggered when at least one limit value of the state characteristic variable of the fluid arranged within the immediate vicinity 72a is exceeded, wherein in particular, when the valve element 56a and the further valve element 58a are triggered, the fluid channels 44a, 46a are closed, in particular in a water-tight manner. In particular, the valve element 56a and the further valve element 58a are provided to be transferred into the closed state directly via the fluid, in particular via a force exerted by the pressure of the fluid on the valve element 56a and the further valve element 58a. The valve element 56a and the further valve element 58a are particularly preferably provided to open or to open up the fluid channels 44a, 46a depending on the state characteristic variable of the fluid arranged in particular within the immediate vicinity 72a of the fluid channels 44a, 46a that is adjacent to the valve element 56a and/or the further valve element 58a, in particular after the state characteristic variable of the fluid drops below the limit value. In particular, the valve element 56a is provided to close the fluid channel 44a, in particular in a water-tight manner, depending on the state characteristic variable of the fluid arranged in particular within the immediate vicinity 72a of the fluid channel 44a that is adjacent to the valve element 56a. The further valve element 58a is preferably provided to close the further fluid channel 46a, in particular in a water-tight manner, depending on a state characteristic variable of the fluid arranged in particular within an immediate vicinity 72a of the further fluid channel 46a that is adjacent to the further valve element 58a.

Alternatively, it is conceivable for the wiper arm adapter device 28a to comprise at least one communication unit and/or line unit 74a (cf. FIG. 1) which is provided to connect the valve element 56a and/or the further valve element 58a to the control and/or regulating unit 34a of the wiper arm adapter device 28a and/or of the wiper 10a. Preferably, the communication unit and/or line unit 74a comprises at least one communication element and/or line element 76a which is arranged on the valve element 56a and/or on the further valve element. In particular, the communication unit and/or line unit 74a and the communication element and/or line element 76a are indicated in FIG. 2. For example, the communication element and/or line element 76a runs from the valve element 56a and/or from the further valve element 58a, in particular along the wiper arm 14a and/or one of the fluid line elements 36a, as far as the control and/or regulating unit 34a. Preferably, the communication element and/or line element 76a is provided for transmitting at least one optical, haptic and/or acoustic signal from the control and/or regulating unit 34a to the valve element 56a and/or to the further valve element 58a, in particular for controlling and/or regulating the valve elements 56a, 58a. In particular in a configuration of the wiper arm adapter device 28a, in which the valve element 56a and/or the further valve element 58a is activatable electrically and/or electronically, it is conceivable for the communication element and/or line element 76a to be provided to transmit control signals of the control and/or regulating unit 34a, in particular for controlling and/or regulating the valve elements 56a, 58a, to the valve element 56a and/or the further valve element 58a via a wireless connection, for example a radio connection and/or an induction-based connection. In particular, the valve element 56a and/or the further valve element 58a are/is provided to change into the closed or the open state depending on the transmitted control commands. In particular in a configuration of the wiper arm adapter device 28a with the sensor unit 68a, it is conceivable for the communication unit and/or line unit 74a to be provided to transmit the state characteristic variable sensed by means of the sensor unit 68a from the sensor unit 68a to the control and/or regulating unit 34a. In particular, the communication element and/or line element 76a is connected to the sensor element 70a of the sensor unit 68a. In particular in a configuration of the wiper arm adapter device 28a with the coupling element 66a, it is conceivable for the coupling element 66a to preferably be provided in order to activate the valve element 56a and/or the further valve element 58a, in particular depending on the unconnected state of the connecting unit 48a.

Figure 3:
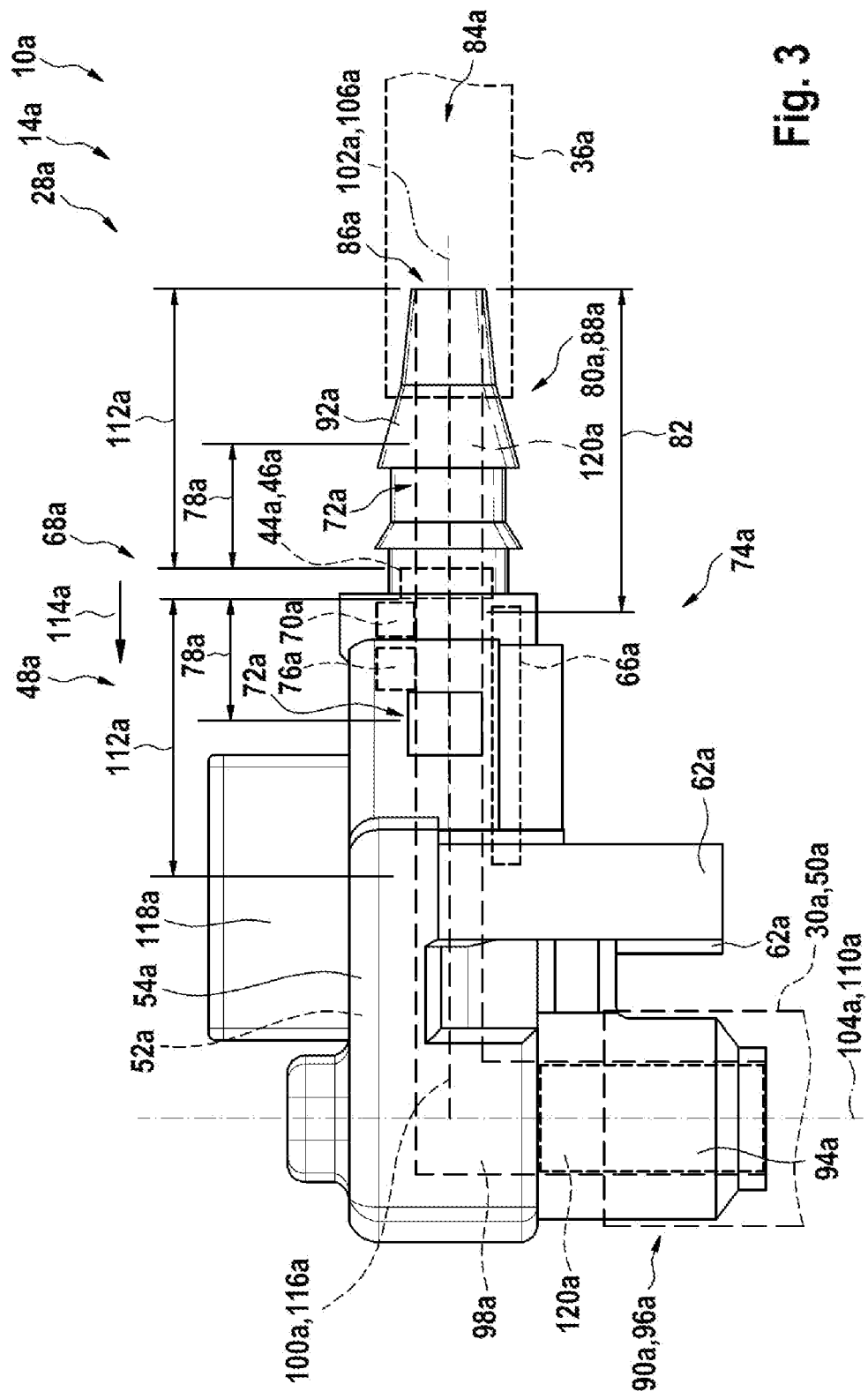
FIG. 3 shows a schematic illustration of a connecting unit of the wiper arm adapter device according to the invention in a side view.

FIG. 3 shows a cutout of the wiper arm adapter device 28a in a side view, in particular with the connecting element 52a, the further connecting element 54a, the fastening elements 62a, the valve element 56a and the further valve element 58a. The immediate vicinity 72a of the fluid channel 44a and/or of the further fluid channel 46a that is adjacent to the valve element 56a and/or to the further valve element 58a extends at a maximum distance 78a of in particular at most 3 cm, preferably at most 2 cm and particularly preferentially at most 1 cm, about the valve element 56a and/or the further valve element 58a within the fluid channel 44a and/or the further fluid channel 46a. The valve element 56a and the further valve element 58a are arranged within a fluid-line-element-side end region 80a of the fluid channels 44a, 46a. The fluid-line-element-side end region 80a extends within a region 98a of the fluid channels 44a, 46a that is delimited by the connecting element 52a and the further connecting element 54a. The fluid-line-element-side end region 80a extends along the fluid channels 44a, 46a over a section 82a which has a length of in particular at most 3 cm, preferably at most 2 cm and particularly preferentially at most 1 cm. In particular, the fluid-line-element-side end region 80a is arranged on a side 84a of that region 98a of the fluid channels 44a, 46a that is delimited by the connecting element 52a and/or the further connecting element 54a, which side is arranged in one plane with a fluid-line-element-side outer surface 86a of the connecting element 52a and/or of the further connecting element 54a, wherein the fluid-line-element-side outer surface 86a is at least partially arranged on and/or lies against one of the fluid line elements 36a, in particular in the connected state of the connecting unit 48a.

The connecting element 52a has two attachment regions 88a, 90a, wherein the connecting element 52a in the two attachment regions 88a, 90a of the connecting element 52a is in this case at least partially designed as an attachment stub 92a, 94a. The connecting element 52a is in each case at least partially designed as an attachment stub 92a in one attachment region 88a of the two attachment regions 88a, 90a of the connecting element 52a, wherein the valve element 56a is at least partially arranged within the attachment region 88a of the connecting element 52a. The further connecting element 54a has two attachment regions 88a, 90a, wherein the further connecting element 54a in the two attachment regions 88a, 90a of the further connecting element 54a is in each case at least partially designed as an attachment stub 92a, 94a. The further connecting element 54a is in each case at least partially designed as an attachment stub 92a in one attachment region 88a of the two attachment regions 88a, 90a of the further connecting element 54a, wherein the further valve element 58a is at least partially arranged within the attachment region 88a of the further connecting element 54a. The attachment stubs 92a, 94a preferably individually at least partially delimit one of the fluid channels 44a, 46a in each case. In particular, in each case one attachment stub 92a of the connecting element 52a and of the further connecting element 54a at least partially delimits the fluid-line-element-side end region 80a of the fluid channels 44a, 46a. Preferably, in each case a further attachment stub 94a of the connecting element 52a and of the further connecting element 54a at least partially delimits a wiper-blade-adapter-side end region 96a of the fluid channels 44a, 46a. The attachment stubs 92a, 94a are preferably provided for connecting, in particular for fastening, the connecting element 52a and the further connecting element 54a to the fluid line elements 36a or to the fluid attachment elements 50a, in particular fluidically. The further attachment stubs 94a of the connecting element 52a and of the further connecting element 54a that delimit the wiper-blade-adapter-side end region 96a are designed differently from the attachment stubs 92a of the connecting element 52a and of the further connecting element 54a that delimit the fluid-line-element-side end region 80a, wherein in particular the attachment stubs 92a are designed in a manner corresponding to the fluid line elements 36a and the further attachment stubs 94a are designed in a manner corresponding to the fluid attachment elements 50a.

Preferably, the fluid channels 44a, 46a have a cross-sectional area in the form of a conical section area, in particular circular area, within that region 98a of the fluid channels 44a, 46a that is delimited by the connecting element 52a and the further connecting element 54a. However, other configurations of the fluid channels 44a, 46a are also conceivable, for example with a cross-sectional area in the form of an elliptical area or a polygonal area. In particular, that region 98a of the fluid channels 44a, 46a which is delimited by the connecting element 52a and the further connecting element 54a extends along a section 100a which has a maximum length with a value from a value range of in particular 2 cm to 10 cm, preferably 3 cm to 8 cm, particularly preferentially 4 cm to 6 cm and very particularly preferentially of 6 cm. A region 120a of the fluid channels 44a, 46a that is delimited by the attachment stubs 92a, 94a of the connecting element 52a or of the further connecting element 54a extends along a section which has a maximum length which corresponds in particular to at least 30%, preferably at least 50%, particularly preferentially at least 60% and very particularly preferentially 60% of the maximum length of the section 100a of that region 98a of the fluid channels 44a, 46a that is delimited by the connecting element 52a and the further connecting element 54a. In particular, the attachment stubs 92a of the connecting element 52a and of the further connecting element 54a in each case have a center axis 102a, which center axes, in the connected state of the connecting unit 48a, are oriented at least substantially parallel to a main axis of extent 106a of the fluid line elements 36a. Preferentially, the further attachment stubs 94a of the connecting element 52a and of the further connecting element 54a each have a center axis 104a, which center axes, in the connected state of the connecting unit 48a, are oriented at least substantially perpendicularly to a main axis of extent 108a of the wiper blade adapter 30a (cf. FIG. 2). The center axes 102a of the attachment stubs 92a are preferably oriented at least substantially perpendicularly to the center axes 104a of the further attachment stubs 94a. In particular, the attachment stubs 92a of the connecting element 52a and of the further connecting element 54a are provided to be at least partially connected to the fluid line elements 36a via a movement along the center axes 102a of the attachment stubs 92a. Preferably, the further attachment stubs 94a of the connecting element 52a and of the further connecting element 54a are provided to be at least partially connected to the fluid attachment elements 50a via a movement along a connecting axis 110a of the connecting unit 48a, in particular of the center axes 104a of the further attachment stubs 94a.

The connecting element 52a is designed in such a manner and/or the valve element 56a is arranged in such a manner that the fluid channel 44a is formed at least substantially rectilinearly at a minimum distance 112a in and counter to a conducting direction 114a of the connecting element 52a of in particular at least 0.5 cm, preferably at least 1 cm, particularly preferentially at least 1.5 cm and very particularly preferentially of 3 cm, from the valve element 56a. The further connecting element 54a is designed in such a manner and/or the further valve element 58a is arranged in such a manner that the further fluid channel 46a is formed at least substantially rectilinearly at the minimum distance 112a in and counter to the conducting direction 114a of the further connecting element 54a of in particular at least 0.5 cm, preferably at least 1 cm, particularly preferentially at least 1.5 cm and very particularly preferentially of 3 cm, from the further valve element 58a. In particular, the conducting directions 114a of the connecting element 52a and of the further connecting element 54a are oriented at least substantially parallel to each other. In particular, that region 98a of the fluid channels 44a, 46a which is delimited by the connecting element 52a and the further connecting element 54a is formed along a curved, in particular at least substantially L-shaped, conducting section 116a. In particular, the conducting section 116a is at least partially formed at least substantially rectilinearly in particular in a region 98a of the fluid channels 44a, 46a in which the valve element 56a and the further valve element 58a are arranged. The conducting directions 114a of the connecting element 52a and of the further connecting element 54a are preferably oriented along the conducting section 116a, in particular from the fluid-line-element-side end region 80a to the wiper-blade-adapter-side end region 96a of the fluid channels 44a, 46a.

The two fastening elements 62a are arranged on the connecting element 52a and on the further connecting element 54a at least substantially perpendicularly to the center axes 102a of the attachment stubs 92a of the connecting element 52a and of the further connecting element 54a. In particular, the connecting element 52a and the further connecting element 54a are provided to be moved along the connecting axis 110a in order to form a fluidic connection with the fluid attachment elements 50a. The connecting axis 110a is preferably oriented at least substantially perpendicularly to the center axes 102a of the attachment stubs 92a of the connecting element 52a and of the further connecting element 54a and/or at least substantially parallel to the center axes 104a of the further attachment stubs 94a of the connecting element 52a and of the further connecting element 54a. The fastening elements 62a are preferably provided in order to interact with the counter fastening elements 64a, in particular to latch into the counter fastening elements 64a, during a movement along the connecting axis 110a for fastening the connecting element 52a and the further connecting element 54a. The wiper arm adapter device 28a, in particular the connecting unit 48a, preferably has an operating element 118a which is arranged on the connecting element 52a and/or on the further connecting element 54a. The operating element 118a is provided in particular to detach the fastening elements 62a from the counter fastening elements 64a upon actuation by an operator, in particular for separating the connecting element 52a and the further connecting element 54a from the fluid attachment elements 50a. It is preferentially conceivable for the coupling element 66a, the valve element 56a and/or the further valve element 58a to be designed to be functionally coupled to the operating element 118a and/or to the fastening elements 62a for closing the valve element 56a and/or the further valve element 58a when the connecting element 52a and the further connecting element 54a are separated from the fluid attachment elements 50a. In particular, it is conceivable for the operating element 118a and/or the fastening elements 62a to be designed in such a manner that the valve element 56a and/or the further valve element 58a are/is closed and/or are/is held in a closed state in particular via the coupling element 66a, when the operating element 118a is actuated and/or the fastening elements 62a are detached from the counter fastening elements 64a.

Figure 4:
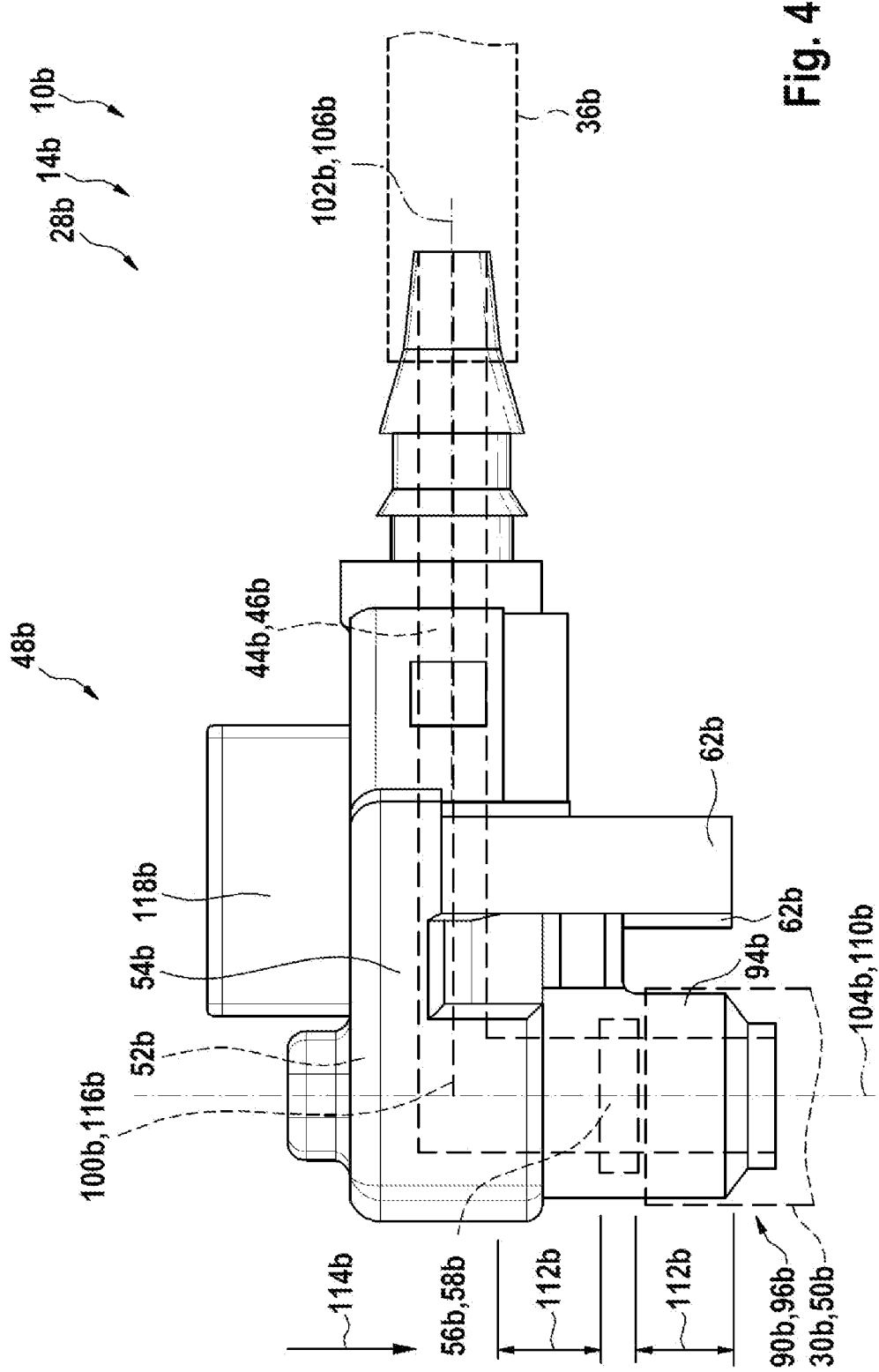
FIG. 4 shows a schematic illustration of a connecting unit of an alternative configuration of a wiper arm adapter device according to the invention in a side view.

FIG. 4 shows a further exemplary embodiment of the invention. The descriptions below and the drawings are essentially limited to the differences between the exemplary embodiments, wherein with regard to components denoted identically, in particular with regard to components with the same reference signs, reference can basically also be made to the drawings and/or the description of the other exemplary embodiments, in particular of FIGS. 1 to 3. To distinguish between the exemplary embodiments, the letter a has been placed after the reference signs of the exemplary embodiment in FIGS. 1 to 3. In the exemplary embodiment of FIG. 4, the letter a has been replaced by the letter b.

FIG. 4 shows a cutout of an alternative configuration of a wiper arm adapter device 28b of a wiper arm 14b of a wiper 10b in a side view. The wiper arm adapter device 28b comprises two fluid channels 44b, 46b for conducting a fluid and a connecting unit 48b for, in particular fluidically, connecting the fluid channels 44b, 46b to a fluid line element 36b of a wiper arm 14b and/or to a wiper blade adapter 30b, in particular to fluid attachment elements 50b of the wiper blade adapter 30b. The connecting unit 48b comprises a connecting element 52b and a further connecting element 54b which each at least partially delimit one of the fluid channels 44b, 46b. The connecting unit 48b comprises a valve element 56b and a further valve element 58b, wherein the valve element 56b is arranged on the connecting element 52b and the further valve element 58b is arranged on the further connecting element 54b. The valve element 56b and the further valve element 58b are provided in order to form the fluidic connection of the fluid channels 44b, 46b to the wiper blade adapter 30b, in particular to the fluid attachment elements 50b, in a closeable manner. However, other configurations of the wiper arm adapter device 28b, in particular of the connecting unit 48b, are also conceivable, for example with a number of connecting elements 52b, 54b, fluid channels 44b, 46b and/or valve elements 56a, 58a differing from two, in particular with one or more than two thereof. The wiper arm adapter device 28b illustrated in FIG. 4 has an at least substantially analogous configuration to the wiper arm adapter device 28b described in the description of FIGS. 1 to 3, and therefore reference can at least substantially be made to the description of FIGS. 1 to 3 with regard to a configuration of the wiper arm adapter device 28b illustrated in FIG. 4. In contrast to the wiper arm adapter device 28a described in the description of FIGS. 1 to 3, the valve element 56b and the further valve element 58b of the wiper arm adapter device 28b illustrated in FIG. 4 are preferably arranged within a wiper-blade-adapter-side end region 96b of the fluid channels 44b, 46b. The connecting element 52b is in each case at least partially designed as an attachment stub 94b in one attachment region 90b of the connecting element 52b, wherein the valve element 56b is at least partially arranged within the attachment region 90b of the connecting element 52b. The further connecting element 54b is in each case at least partially designed as an attachment stub 94a in one attachment region 90b of the further connecting element 54b, wherein the further valve element 58b is at least partially arranged within the attachment region 90b of the further connecting element 54b. The connecting element 52b and the further connecting element 54b are designed in such a manner and/or arranged in such a manner that the fluid channels 44b, 46b are formed at least substantially rectilinearly at a minimum distance 112b in and counter to a conducting direction 114b of the connecting element 52b and of the further connecting element 54b of at least 0.5 cm, preferably at least 1 cm and particularly preferentially at least 1.5 cm and very particularly preferentially of 1.5 cm, from the valve element 56b and/or the further valve element 58b.

What is claimed is:

1. A wiper arm adapter device comprising
at least one fluid channel (44a, 46a; 44b, 46b) for conducting a fluid, and
at least one connecting unit (48a; 48b) for connecting the fluid channel (44a, 46a; 44b, 46b) to a fluid line element (36a; 36b) of a wiper arm (14a; 14b) and to a wiper blade adapter (30a; 30b),
wherein the connecting unit (48a; 48b) has at least one connecting element (52a, 54a; 52b, 54b) which at least partially delimits the fluid channel (44a, 46a; 44b, 46b), and
wherein the connecting unit (48a; 48b) has at least one valve element (56a, 58a; 56b, 58b) which is arranged within the connecting element (52a, 54a; 52b, 54b) and is configured to form a fluidic connection of the fluid channel (44a, 46a; 44b, 46b) to the fluid line element (36a; 36b) of the wiper arm (14a; 14b) and to the wiper blade adapter (30a; 30b);
wherein the valve element (56a, 58a; 56b, 58b) is arranged within the connecting element (52a, 54a; 52b, 54b) such that the fluid channel (44a, 46a; 44b, 46b) extends within the connecting element (52a, 54a; 52b, 54b) for a minimum distance (112a; 112b) of at least 0.5 cm away from the valve element (56a, 58a; 56b, 58b) and toward the fluid line element (36a; 36b) of the wiper arm (14a; 14b).

2. The wiper arm adapter device according to claim 1, characterized in that the valve element (56a, 58a; 56b, 58b) is configured to close the fluid channel (44a, 46a; 44b, 46b) depending on a state characteristic variable of the fluid.

3. The wiper arm adapter device according to claim 1, characterized in that the valve element (56a, 58a; 56b, 58b) is arranged within a wiper-blade-adapter-side end region (96a; 96b) or a fluid-line-element-side end region (80b) of the fluid channel (44a, 46a; 44b, 46b).

4. The wiper arm adapter device according to claim 1, characterized in that the connecting element (52a, 54a; 52b, 54b) is at least partially configured as an attachment stub (92a, 94a; 94b) in at least one attachment region (88a, 90a; 90b) of the connecting element (52a, 54a; 52b, 54b), wherein the valve element (56a, 58a; 56b, 58b) is at least partially arranged within the attachment region (88a, 90a; 90b).

5. The wiper arm adapter device according to claim 1, wherein the fluid channel (44a, 46a; 44b, 46b) extends at least substantially rectilinearly for the minimum distance (112a; 112b) toward the fluid line element (36a; 36b) of the wiper arm (14a; 14b), and wherein the fluid channel also extends a minimum distance (112a; 112b) of at least 0.5 cm away from the valve element (56a, 58a; 56b, 58b) in a conducting direction (114a; 114b) of the connecting element (52a, 54a; 52b, 54b).

6. The wiper arm adapter device according to claim 1, characterized in that the valve element (56a, 58a; 56b, 58b)

is configured as a Dunlop valve, as a Sclaverand valve, as a Schrader valve, as a diaphragm valve or as a nonreturn valve.

7. The wiper arm adapter device according to claim 1, characterized in that the connecting unit (48*a*; 48*b*) has at least one further connecting element (54*a*; 54*b*) and at least one further valve element (58*a*; 58*b*), wherein the further valve element (58*a*; 58*b*) is arranged on the further connecting element (54*a*; 54*b*).

8. The wiper arm adapter device according to claim 1, characterized in that the valve element (56*a*, 58*a*; 56*b*, 58*b*) is configured to be activatable electrically, electronically, mechanically, pneumatically and/or hydraulically.

9. A wiper arm with at least one wiper arm adapter device (28*a*; 28*b*) according to claim 1.

10. A wiper with at least one wiper blade (16*a*) and with at least one wiper arm (14*a*; 14*b*) according to claim 9.

11. The wiper arm adapter device according to claim 1, wherein the wiper blade adapter (30*a*; 30*b*) includes a fluid attachment element (50*a*), the wiper arm adapter device further comprising at least one coupling element (66*a*) configured to close the valve element (56*a*), such that during a separation of the connecting element (52*a*) from the fluid attachment element (50*a*), the coupling element (66*a*) is configured to block the valve element (56*a*).

12. The wiper arm adapter device according to claim 11, wherein the at least one coupling element (66*a*) is a spring-loaded pin.

13. A wiper arm adapter device comprising
at least one fluid channel (44*a*, 46*a*; 44*b*, 46*b*) for conducting a fluid, and
at least one connecting unit (48*a*; 48*b*) for fluidically connecting the fluid channel (44*a*, 46*a*; 44*b*, 46*b*) to a fluid attachment element (50*a*; 50*b*) of the wiper blade adapter (30*a*; 30*b*),
wherein the connecting unit (48*a*; 48*b*) has at least one L-shaped connecting element (52*a*, 54*a*; 52*b*, 54*b*) which at least partially delimits the fluid channel (44*a*, 46*a*; 44*b*, 46*b*), wherein the L-shaped connecting element (52*a*, 54*a*; 52*b*, 54*b*) includes a first region that couples directly to the wiper blade adapter (30*a*; 30*b*) and a second region that extends perpendicular to the first region, and
wherein the connecting unit (48*a*; 48*b*) has at least one valve element (56*a*, 58*a*; 56*b*, 58*b*) which is arranged within the first region of the connecting element (52*a*, 54*a*; 52*b*, 54*b*) and is configured to form the fluidic connection of the fluid channel (44*a*, 46*a*; 44*b*, 46*b*) to the fluid attachment element (50*a*; 50*b*) in a closeable manner.

14. The wiper arm adapter device according to claim 13, characterized in that the valve element (56*a*, 58*a*; 56*b*, 58*b*) is configured to close the fluid channel (44*a*, 46*a*; 44*b*, 46*b*) in a water-tight manner, depending on a state characteristic variable of the fluid disposed within an immediate vicinity (72*a*; 72*b*) of the fluid channel (44*a*, 46*a*; 44*b*, 46*b*) that is adjacent to the valve element (56*a*, 58*a*; 56*b*, 58*b*).

15. The wiper arm adapter device according to claim 13, characterized in that the valve element (56*a*, 58*a*; 56*b*, 58*b*) is arranged within a wiper-blade-adapter-side end region (96*a*; 96*b*) or a fluid-line-element-side end region (80*b*) of the fluid channel (44*a*, 46*a*; 44*b*, 46*b*).

16. The wiper arm adapter device according to claim 13, characterized in that the connecting element (52*a*, 54*a*; 52*b*, 54*b*) is at least partially configured as an attachment stub (92*a*, 94*a*; 94*b*) in at least one attachment region (88*a*, 90*a*; 90*b*) of the connecting element (52*a*, 54*a*; 52*b*, 54*b*), wherein the valve element (56*a*, 58*a*; 56*b*, 58*b*) is at least partially arranged within the attachment region (88*a*, 90*a*; 90*b*).

17. The wiper arm adapter device according to claim 13, characterized in that the connecting element (52*a*, 54*a*; 52*b*, 54*b*) is configured in such a manner and/or the valve element (56*a*, 58*a*; 56*b*, 58*b*) is arranged in such a manner that the fluid channel (44*a*, 46*a*; 44*b*, 46*b*) extends at least substantially rectilinearly for a minimum distance (112*a*; 112*b*) of at least 0.5 cm from the valve element (56*a*, 58*a*; 56*b*, 58*b*) in and/or counter to a conducting direction (114*a*; 114*b*) of the connecting element (52*a*, 54*a*; 52*b*, 54*b*).

18. The wiper arm adapter device according to claim 13, characterized in that the valve element (56*a*, 58*a*; 56*b*, 58*b*) is configured as a Dunlop valve, as a Sclaverand valve, as a Schrader valve, as a diaphragm valve or as a nonreturn valve.

19. The wiper arm adapter device according to claim 13, characterized in that the connecting unit (48*a*; 48*b*) has at least one further connecting element (54*a*; 54*b*) and at least one further valve element (58*a*; 58*b*), wherein the further valve element (58*a*; 58*b*) is arranged on the further connecting element (54*a*; 54*b*).

20. The wiper arm adapter device according to claim 13, characterized in that the valve element (56*a*, 58*a*; 56*b*, 58*b*) is configured to be activatable electrically, electronically, mechanically, pneumatically and/or hydraulically.

21. The wiper arm adapter device according to claim 13, further comprising at least one coupling element (66*a*) configured to close the valve element (56*a*), such that during a separation of the connecting element (52*a*) from the fluid attachment element (50*a*), the coupling element (66*a*) is configured to block the valve element (56*a*).

22. The wiper arm adapter device according to claim 21, wherein the at least one coupling element (66*a*) is a spring-loaded pin.

* * * * *